United States Patent

Wiggill

[15] 3,649,335
[45] Mar. 14, 1972

[54] SILICA/ELASTOMER COMPOSITES AND METHOD OF PRODUCING SAME

[72] Inventor: John B. Wiggill, Orange, Tex.

[73] Assignee: E. I. du Pont de Nemours and Company, Wilmington, Del.

[22] Filed: Sept. 17, 1969

[21] Appl. No.: 858,879

[52] U.S. Cl. .............................117/62.1, 117/45, 117/72, 117/118, 117/123 D, 117/124 F, 117/126 GS, 117/126 GN, 117/161 ZA
[51] Int. Cl. ................C03c 25/02, B32b 17/04, B32b 17/10
[58] Field of Search ...............117/126 GB, 126 GS, 126 GN, 117/72, 62.1, 118, 161 ZA, 123 D, 45, 124 F; 260/88.1 R

[56] References Cited

UNITED STATES PATENTS

| | | | |
|---|---|---|---|
| 3,408,420 | 10/1968 | Wiggill | 260/88.1 X |
| 3,427,187 | 2/1969 | Wiggill | 117/161 ZA |
| 3,441,545 | 4/1969 | Blatz et al. | 260/88.1 R |

Primary Examiner—William D. Martin
Assistant Examiner—D. Cohen
Attorney—Earl L. Handley

[57] ABSTRACT

A silica/elastomer composite produced by reacting an ethylene or propylene containing copolymer having units such as

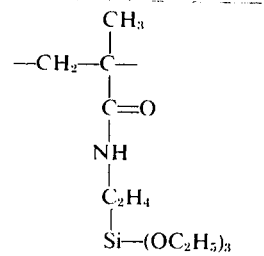

and units such as

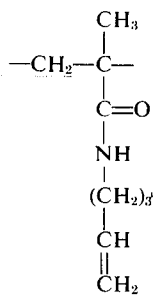

with a silica substrate by hydrolysis of the silane group, and then polymerizing the allyl group to an elastomer.

5 Claims, No Drawings

SILICA/ELASTOMER COMPOSITES AND METHOD OF PRODUCING SAME

This invention relates to a process of producing a composite article of silica and elastomer in which the silica is tightly bound to the elastomer. More particularly, this invention relates to a process of producing silica substrate bonded to an elastomer by means of the reaction of an alpha olefin copolymer containing units having the formula (A):

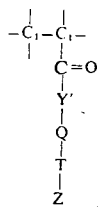

and units having the formula (B):

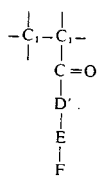

with a silica substrate and then polymerizing the pendant unsaturated F group to an elastomer.

It is known in the art to produce copolymers of ethylene or propylene containing units having the formula (A):

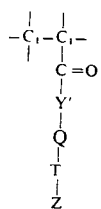

and radicals having the formula:

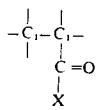

where $C_1$ is a carbon atom in the main polymer chain, $Y'$ is a radical selected from the class consisting of —O— and

Q is a divalent radical having one to 22 carbon atoms that is bonded through carbon atoms to both $Y'$ and T, T is a silicon containing radical selected from the class consisting of

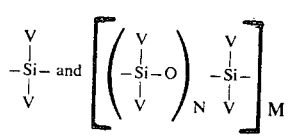

where N is one to 28, M is 1; Z is a hydrolyzable group; R is a radical selected from the class consisting of hydrogen and hydrocarbon containing radicals containing one to 22 carbon atoms; V is selected from the class consisting of R and Z, and X is halogen. Such copolymers are disclosed and claimed in U.S. Pat. No. 3,408,420. It is further disclosed in said patent that the halogen atom can be reacted with a "hydroxyl group, carboxylic acid group or NH group-containing substrates ..., or with other monomer units to further modify the polymer properties."

It is also known in the art, to react an alpha olefin copolymer containing unit having the formula:

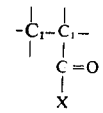

with one or more different monomers having groups that react with acid halide, such as allyl alcohol to produce a copolymer capable of further reaction. Such copolymers are disclosed in British Pat. No. 1,064,026.

The present invention employs as one starting material the copolymer of U.S. Pat. No. 3,408,420, in which the unreacted

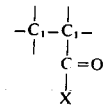

groups are reacted with an unsaturated alcohol, an unsaturated amine, or an unsaturated mercaptan. The alcohol, amine, or mercaptan may contain from three to 40 carbon atoms. Thus, the compound reacting with the acid halide containing polymer may have the formula:

$$D - E - F$$

wherein D is HO, HN— or SH, E is a divalent radical having

one to 22 carbon atoms that is bonded through carbon atoms to both D and F, and F is a radical having the formula:

and R is hydrogen or a hydrocarbon radical having one to 22 carbon atoms. Specific compounds having this formula that are satisfactory are: allyl alcohol; 5 hexen-1-ol; allyl mercaptan; p-allyl phenol; 3 buten-1-ol; 4 penten-1-ol; 3 methyl-3 buten-1-ol; 2 methyl-2 propen-1-ol; O-allyl phenol; 1-allyl cyclohexanol; 4-hexen-1-ol; hydroxy styrene; amino styrene; diallyl amine; 3 hexen-1-ol; 7-octen-1-ol; 6 hepten-1-ol; and allyl amine.

The reaction of the unsaturated molecule with the copolymer containing the silane group may be carried out while the copolymer is dissolved in solution. As disclosed in U.S. Pat. No. 3,408,420, a solution of copolymer containing the silane group is obtained as this copolymer is formed, that is the copolymer is formed by dissolving an alpha olefin/acid halide copolymer and then reacting some or all of the halide groups with a silane compound such as gamma-amino-propyl-triethoxy-silane. If less than a stoichiometric amount of the silane compound is added to the solution, acid halide groups remain. The unsaturated compound may then be added to react with these remaining acid halide groups. In the copolymer used to react with the glass and the elastomer, the number of units having the formula (A):

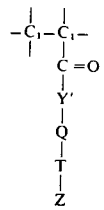

will usually be between 0.1 and 24.9 mol percent of the total units in the copolymer and the units having the formula (B):

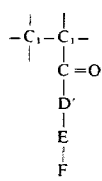

(where D' is a D radical that has lost one hydrogen atom by reaction with the acid halide, i.e., —O—, —S—, or $$-\underset{R}{N}-$$

will be present in amounts of between 0.1 and 24.9 mol percent of the total units in the copolymer. The total number of units A and B should normally not exceed 25 mol percent of the units in the copolymer.

The copolymer is normally applied to the silica surface from a solution of the copolymer in a suitable solvent and as carbon tetrachloride, tetrachloroethylene, trichloroethylene, toluene, benzene, xylene, cyclohexane, hexane, and the like. The copolymer is preferably present in the solvent to the extent of between about 0.1 and 50 parts per 100 parts by weight solvent. The reaction of the copolymer and the silicic surface takes place on contacting the silicic surface with the solution of the copolymer. The hydrolysis reaction forms a linkage

which in the general formula (A) above would correspond to

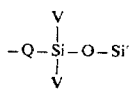

where Si' is a silicon atom of the silicic surface. Silicic surfaces normally absorb water from air, but even dried silicic surfaces cause reactions to take place. Coating silicic substrates with copolymer of this type is disclosed in U.S. Pat. No. 3,427,187, issued Feb. 11, 1969. The copolymer may also be applied as a solution in a solvent to the silicic substrate by spraying, brush painting, or from a melt.

The silica substrate used may be in any form. Often the silica will be in the form of glass fibers. The fibers may be coated promptly after formation, by passing the fibers through a bath of the copolymer. The fibers may then be chopped into lengths for mixing with the elastomer, or formed into a mat to be impregnated with elastomer.

The elastomer employed may be any noncrosslinked natural or synthetic elastomer. If the bonding of the elastomer is to be accomplished by sulfur curing, then the elastomer must contain unsaturation such as is present in natural rubbers, and rubbers formed from dienes. A particularly useful class of elastomers are those formed by coordination polymerization of ethylene-propylene, and hexadiene-1,4. If the bonding of the rubber is to be accomplished by a peroxide cure, the elastomer need not contain unsaturation, and the elastomers may be, for example, an ethylene/propylene copolymer or chlorosulfonated polyethylene. Thus the F radical of formula (B) above is polymerized to the elastomer through the valences shown as unfilled in the following formula pendant from the divalent E radical

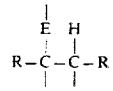

The silicic substrate coated with the copolymer may be combined with the elastomer to form the composite of this invention by many techniques, which will differ significantly depending on the type of final article desired. If it is desired that the final article be a tight glass to rubber seal, as around the windows of a vehicle, the uncrosslinked rubber would be applied to the edge of the silicic substrate, and then cured. If on the other hand the final article is to be a reinforced elastomeric article, the glass would be in the form of fibers which could be fed to an extruder along with the elastomer. Likewise, if the final article is to be a rubber tire having a belt of glass fiber under the tread, the belt might be applied over the cord and then the uncrosslinked rubber applied.

It is therefore apparent that the amount of glass and the amount of elastomer in the final article will vary with the particular article being made. In the case of molded articles containing glass fiber for reinforcement, the amount of glass fiber will usually be between 5 and 50 percent by weight of the total.

Normally the curing agent is added to the elastomer as it is added to or mixed with the silicic substrate. The amount of curing agent added is not substantially more than that needed to cross-link the elastomer; about 3 to 10 weight percent the elastomer is conveniently used. The agents and combination of agents used to cross-link elastomers may be used. Thus, one or more peroxide initiators or one or more sulfur compounds may be used.

The temperatures at which the curing of the silicic/elastomer composite is accomplished are those conventional in the elastomer curing art, and may vary from 50° C. to 200° C.

In the following examples which illustrate the invention all parts and percents are by weight.

EXAMPLE 1

A random ethylene-methacrylic acid copolymer, whose composition was 87.8 weight percent ethylene units and 12.2 weight percent acid units, was completely converted to the acid chloride derivative using phosphorous pentachloride; an infrared scan of a film pressed from the ethylene-methacrylyl chloride polymer had a peak at 5.6 microns due to the acid chloride carbonyl and no peaks at 3.0, 6.1 and 6.6 microns. Ten grams of this ethylene-methacrylyl chloride polymer were dissolved in 500 cc. of tetrachloroethylene with heating and stirring at 120° C. When the polymer was completely in solution 1.46 cc. of gamma-amino-propyl-triethoxy-silane were added to react with the polymer. The mixture was stirred briefly and 0.73 cc. of 5-hexen-1-ol was added with continued stirring.

The solution thus prepared was used to coat glass fibers of about 0.5 inch length which were added to the solution, and then strained out.

Ten weight percent of the thus coated glass fibers were mixed with an ethylene/propylene/1,4-hexadiene terpolymer (90 weight percent) containing about 67 mol percent ethylene, 31 mol percent propylene, and 1-2 mol percent hexadiene, by milling on a Farrell Birmingham rubber mill having 3-inch rollers. One roller was operated at 37 r.p.m. and the other roller at 26.4 r.p.m. at a temperature of 150° C. A curing agent consisting of 5 parts of ZnO; 1.5 parts of tetramethylthiuram monosulfide; 1.5 parts of sulfur; and 0.75 part of 2-mercaptobenzothiazole was added, and the mixture milled for 15 minutes.

The composition was then molded into a sheet 6 × 6 × 0.05 inches on a press at 40,000 lbs. pressure at 160° C. for 2 minutes, and held at that pressure and temperature for 45 minutes.

The molded sheets were then die cut to proper testing shape. The tensile and flexural specimens were cut at a 90° angle at opposite ends of the compression molded sheet. The specimens were tested for tensile strength ASTM D-638, elongations at break ASTM D-638, and stiffness ASTM D-747; the results (average of 4 determinations) are shown (as item 1) in Table I, which also shows the results (average of 4 determinations) obtained on the same cured elastomer without the glass fibers, item 2, the same cured elastomer containing 10 weight percent glass fibers but without treatment of the glass fibers with a coupling agent, item 3, the same cured elastomer containing 10 weight percent glass fibers having a coating of the coupling agent obtained by reacting a stoichiometric amount of gamma-aminopropyl-triethoxysilane with the ethylene methacrylyl chloride polymer, item 4.

tained 17.6 weight percent acid chloride. This copolymer was reacted with 0.6 equivalent of the silane of Example 1, and 0.4 equivalent of allyl amine. The glass to be coated was quickly passed through the flame of a Meker Burner, and after cooling to room temperature, dipped into the solution and dried. The glass was then heated in an oven at 100° C. for 1 hour.

The elastomers were formed into 6 inch × 6 inch × 0.020 inch sheets by means of a press operated at 50° C. for 1 minute at 100 p.s.i. These sheets were cut into 1 inch × 6 inch strips and a sandwich of the glass, elastomer and polyethylene terephthalate was made. The elastomer to be tested was covered on the side opposite the glass with a sheet of polyethylene terephthalate.

The sandwich was then cured in a press at 30 p.s.i. After curing, the elastomer with the polyethylene terephthalate still in place was stripped from the glass using an Instron equipped with rubber face grips, at a crosshead speed of 2 inches/minute.

Table II gives the results.

TABLE II

| Elastomer | Form | Coupling agent (0.03% on glass) | Cure recipe (defined below) | Cure cycle (defined below) | Peal strength (lbs./inch) |
|---|---|---|---|---|---|
| Natural Rubber: | | | | | |
| (Smoked Crepe) | Gum Stock | None | A | A | 0 |
| Do | do | Yes | A | A | 0.35 |
| Do | Black Filled | Yes | A' | A | 0.85 |
| Styrene/Butadiene: | | | | | |
| Ameripol 1502 | Gum Stock | None | B | B | 6.0 |
| Do | do | No* | B | B | 10.1 |
| Do | do | Yes | B | B | 9.1 |
| Ameripol 1824 | Black Filled oil extended. | No* | B | B | 3.0 |
| Do | do | Yes | B | B | 3.9 |
| Ethylene/Propylene/Hexadiene: | | | | | |
| Nordel 1040 | Gum Stock | None | C | C | 0.04 |
| Do | do | No* | C | C | 0.56 |
| Do | do | Yes | C | C | 1.2 |
| Do | Black Filled | Yes | C' | C | 4.2 |
| Vistalon 3509 | Gum Stock | None | C | C | 0.05 |
| Do | do | Yes | C | C | 1.7 |
| Do | Black Filled | Yes | C' | C | 5.1 |
| Royalene 301 | Gum Stock | None | C | C | 0.06 |
| Do | do | Yes | C | C | 3.7 |
| Do | Black Filled | None | C' | C | 0.14 |
| Do | do | Yes | C' | C | 10.7 |
| Chlorosulfonated Polyethylene: | | | | | |
| Hypalon 40 | Gum Stock | None | D | D | 0.4 |
| Do | do | No* | D | D | 10.2 |
| Do | do | Yes | D | D | 20.9 |

*Copolymer of ethylene/methacrylyl chloride containing 17.6 weight percent acid chloride units reacted with a stoichiometric amount of gamma-amino-propyl-triethoxy silane.

TABLE I

| Item | Coupling agent | Tensile strength (p.s.i.) | Elongation at break (percent) | stiffness (p.s.i.) |
|---|---|---|---|---|
| 1 | Copolymer containing units A & B. | 234 | 160 | 1080 |
| 2 | None (no glass) | 209 | 210 | 143 |
| 3 | None | 203 | 240 | 550 |
| 4 | Copolymer containing units A but no B units. | 215 | 140 | 760 |

EXAMPLE 2

A group of commercially available elastomers were bonded to glass strips to test the adhesion of the elastomer to the glass. The copolymer coupling agent was prepared as in Example 1, except that the ethylene/methacrylyl chloride copolymer con- Definitions: "cure recipe" used in Table II (parts per hundred parts resin)

| | |
|---|---|
| Zinc Oxide | 6.0 |
| Sulfur | 3.5 |
| Stearic acid | 1.0 |
| Cure recipe: A' | |

Same as A, but additionally 30 parts of high abrasion furnace black are added.
Cure recipe: B

| | |
|---|---|
| Zinc Oxide | 5.0 |
| Sulfur | 2.0 |
| Stearic acid | 1.5 |
| Cure recipe: B' | |

| | |
|---|---|
| Zinc Oxide | 5.0 |
| Sulfur | 2.0 |
| Mercaptobenzothyiozyldisulfide | 2.75 |

Cure recipe: C

| | |
|---|---|
| Zinc Oxide | 5.0 |
| Tetramethyl thiuram monosulfide | 1.5 |
| Mercaptobenzothiazole | 0.75 |
| Sulfur | 1.5 |

Cure recipe: C'

Same as C, but also containing 30 parts of high abrasion furnace black.

Cure recipe: D

| | |
|---|---|
| Sublimated Litharge | 2.5 |
| Mercaptobenzothiazyldisulfide | 0.5 |
| Dipentamethylenethiuram tetrasulfide | 2.0 |

Definitions: "cure cycle" used in Table II

| | |
|---|---|
| Cure Cycle A: | 145° C. for 15 minutes |
| Cure Cycle B: | 145° C. for 50 minutes |
| Cure Cycle C: | 160° C. for 20 minutes |
| Cure Cycle D: | 145° C. for 30 minutes |

EXAMPLE 3

Approximately the same results may be obtained using a coupling agent formed by the reaction of ethylene/methacrylyl chloride copolymer containing 17.6 weight percent acid chloride, that has been reacted with 0.7 equivalent of gamma aminopropyl triethoxy silane and 0.3 equivalent of allyl alcohol.

I claim:

1. A process for producing silica/elastomer composites which comprises reacting a solution of a copolymer containing at least 50 mol percent alpha olefin units of two to three carbon atoms, and at least 0.1 to 24.9 mol percent units of the formula (A):

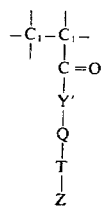

and at least 0.1 to 24.9 mol percent units of the formula (B):

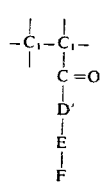

where $C_1$ is a carbon atom in the main copolymer chain Y' is selected from the class consisting of oxygen and

Q is a divalent radical having one to 22 carbon atoms that is bonded through carbon atoms to both Y' and T, T is a silicon containing radical selected from the class consisting of

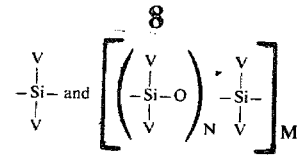

where N is 1 to 28 and M is 1, Z is a hydrolyzable group; R is a radical selected from the class consisting of hydrogen and hydrocarbon containing radicals containing 1 to 22 carbon atoms, V is selected from the class consisting of R and Z, D' is oxygen, sulfur or

E is a divalent radical having one to 22 carbon atoms that is bonded through carbon atoms to both D' and F, and F is a radical having the formula

the total number of units (A) plus (B) being present in the copolymer in amounts not in excess of 25 mol percent, with a silica substrate, by hydrolyzing at least some of the Z groups while the solution of the copolymer is in contact with a silica substrate to form a coating on at least a portion of the silica substrate, intimately contacting the thus coated silica substrate with an elastomer and polymerizing said elastomer to the coating on the silica substrate through the pendant unsaturated group F of the units of formula B.

2. A composite comprising silica tightly bound to an elastomer through a copolymer containing at least 50 mol percent alpha-olefin units of two to three carbon atoms and at least 0.1 to 24.9 mol percent units of the formula (A)

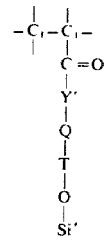

and at least 0.1 to 24.9 mol percent units of the formula (B)

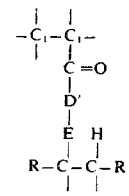

where $C_1$ is a carbon atom in the main copolymer chain, Y' is selected from the class consisting of oxygen and Q is a divalent radical having one to 22 carbon atoms that is bonded through carbon atoms to both Y' and T, T is a silicon containing radical selected from the class consisting of

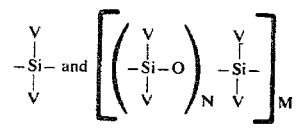

where N is 1 to 28 and M is 1, R is a radical selected from the class consisting of hydrogen and hydrocarbon containing radicals containing one to 22 carbon atoms, V is selected from the class consisting of R and Z, Z is a hydrolyzable group, D' is oxygen, sulfur, or $$-\underset{R}{N}-$$

E is a divalent radical having one to 22 carbon atoms that is bonded through carbon atoms to both D' and the $$R-\underset{|}{\overset{|}{C}}-\underset{|}{\overset{|}{C}}-R$$

group, Si' is a silicon atom in the silica substrate, and the valences of the group pendant from the divalent E radical shown in formula (B) as unfilled, are polymerized to an elastomer, the total number of units (A) plus (B) being present in the copolymer in amounts not in excess of 25 mol percent.

3. The process of claim 1 in which the elastomer contains pendant unsaturation, and in which the polymerizing of the elastomer to the coating is by means of a sulfur containing cross-linking agent.

4. The process of claim 1 in which D' is oxygen, E is —CH$_2$— and F is $$-\underset{H}{\overset{}{C}}=CH_2.$$

5. The process of claim 1 in which D' is $$-\underset{H}{N}-,$$

E is —CH$_2$— and F is $$-\underset{H}{\overset{}{C}}=CH_2.$$

* * * * *